(12) United States Patent
Huang et al.

(10) Patent No.: US 6,647,307 B1
(45) Date of Patent: Nov. 11, 2003

(54) METHOD FOR CONTROLLING QUEUE TIME CONSTRAINTS IN A FABRICATION FACILITY

(75) Inventors: Liang-Kai Huang, Hsin-Chu (TW); Span Lu, Hsin-Chu (TW); Ren-Chyi You, Ilan (TW); Kuang-Huan Hsu, Chiai (TW)

(73) Assignee: Taiwan Semiconductor Mfg. Co. Ltd., Hsin-Chu (TW)

( * ) Notice: Subject to any disclaimer, the term of this patent is extended or adjusted under 35 U.S.C. 154(b) by 0 days.

(21) Appl. No.: 10/290,006

(22) Filed: Nov. 7, 2002

(51) Int. Cl.[7] .............................................. G06F 19/00
(52) U.S. Cl. ..................... 700/102; 700/99; 700/100; 700/101; 700/102; 700/103
(58) Field of Search .................. 700/99, 100, 101, 700/102, 103

(56) References Cited

U.S. PATENT DOCUMENTS

| | | | |
|---|---|---|---|
| 5,544,350 A | 8/1996 | Hung et al. .................. 716/19 |
| 5,546,326 A | 8/1996 | Tai et al. ..................... 702/84 |
| 5,586,021 A | 12/1996 | Fargher et al. ............. 700/100 |
| 5,612,886 A | 3/1997 | Weng ......................... 700/101 |
| 5,751,580 A | 5/1998 | Chi ............................ 700/101 |
| 5,818,716 A | 10/1998 | Chin et al. .................. 700/100 |
| 5,825,650 A | 10/1998 | Wang ......................... 700/100 |
| 5,841,677 A | 11/1998 | Yang et al. ................. 702/176 |
| 5,880,960 A | 3/1999 | Lin et al. ..................... 700/99 |
| 5,928,389 A | 7/1999 | Jevtic ....................... 29/25.01 |
| 6,263,253 B1 | 7/2001 | Yang et al. ................... 700/99 |
| 6,353,769 B1 | 3/2002 | Lin ............................ 700/101 |
| 6,356,797 B1 | 3/2002 | Hsieh et al. ................ 700/101 |
| 6,415,260 B1 | 7/2002 | Yang et al. ................... 705/10 |
| 6,434,443 B1 | 8/2002 | Lin ............................ 700/100 |
| 6,463,346 B1 * | 10/2002 | Flockhart et al. ........... 700/102 |
| 6,480,756 B1 * | 11/2002 | Luh et al. ................... 700/108 |

* cited by examiner

*Primary Examiner*—Leo Picard
*Assistant Examiner*—Ryan Jarrett
(74) *Attorney, Agent, or Firm*—Slater & Matsil, L.L.P.

(57) ABSTRACT

An algorithm can be performed to control the dispatch of products in a fabrication or manufacturing facility. The queue time constraint tolerances and tool throughput are initialized for each product. Next the multiple processing demand time can be calculated for each product. The aggregating queue time constraint can then be calculated for each product. If the multiple processing demand time is less than the aggregating queue time constraint for each queue time limit tool, then any lot can be selected to be processed. Otherwise, the product at the given tool should be further processed.

18 Claims, 1 Drawing Sheet

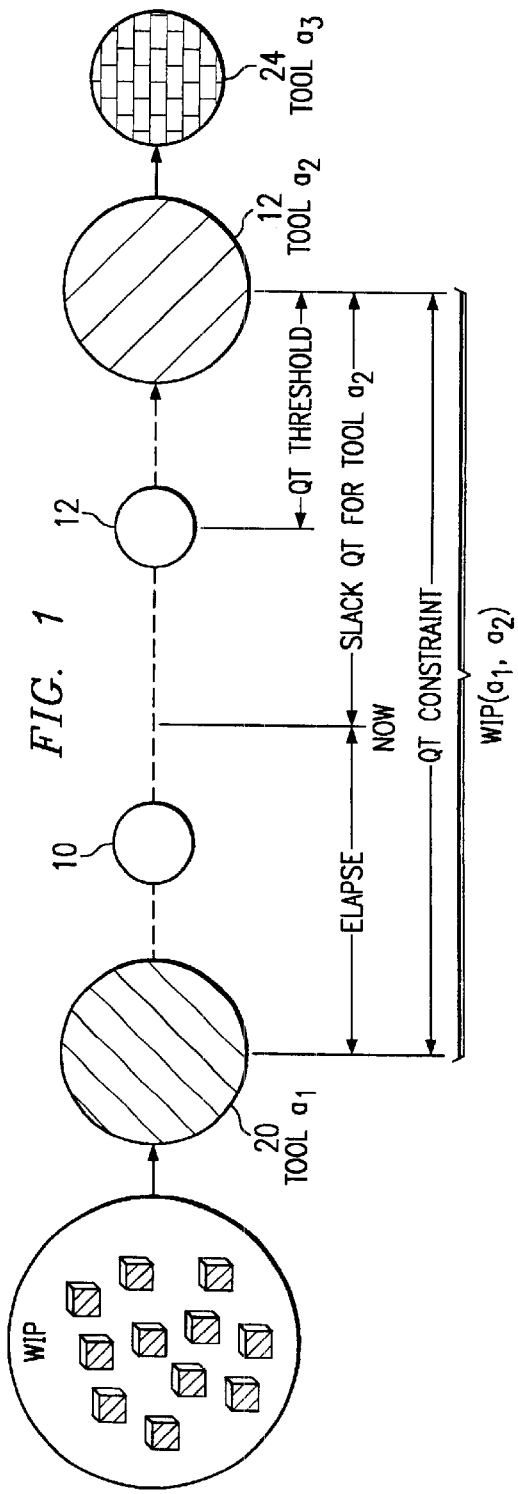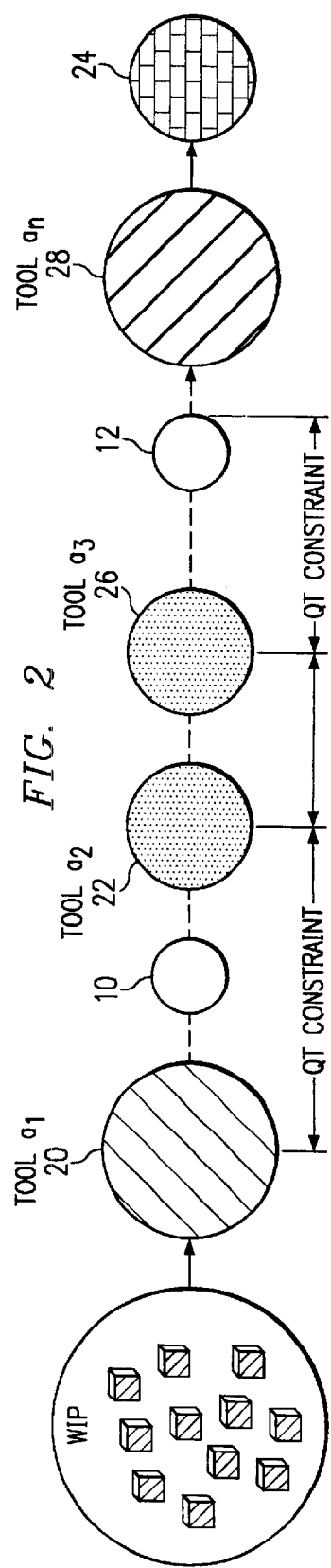

METHOD FOR CONTROLLING QUEUE TIME CONSTRAINTS IN A FABRICATION FACILITY

TECHNICAL FIELD

The present invention relates generally to a system and method for operating a manufacturing line, and more particularly to a system and method for controlling queue time constraints in a fabrication facility.

BACKGROUND

A typical process in manufacturing the semiconductor integrated circuit requires hundreds of steps. These steps include several kinds of stages such as diffusion, lithography, etching, ion implantation, deposition and sputtering. In these kinds of stages, diffusion and implantation generally require longer processing time than other process stages. Other processes will require less processing time. In addition, some processes, e.g., those with long processing time, can be simultaneously performed on several wafer lots (commonly referred to as a "batch").

In a semiconductor's processing line, several lots (and/or batches) and many kinds of products are put into the processing line continuously at the same time. Thus, many kinds of products are operated on during different kinds of stages in the processing flow. But since the processing time of each product is different from each other, determining how many and which wafers to be dispatched into a stage of the processing flow is a dispatching problem.

As another consideration, some processes must be performed within a certain amount of time after other processes. For example, after a deposition step a semiconductor wafer can be exposed to air for only a limited amount of time before the quality of the deposited film will begin to degrade. The time between processes can be referred to as the queue time. Limits on this time can be referred to as queue time constraints.

To control the operation of a fabrication plant, manufacturers have utilized queuing theory, which deals with problems that involve queuing or waiting. These theories can be utilized to optimize the flow of devices, or lots that include a number of devices, through a fabrication facility. For example, Little's formula can be used to calculate expected time between processes. This formula states that the mean number of jobs in a queuing system in the steady state is equal to the product of the arrival rate and the mean response time.

To ensure high quality, controls can be utilized to limit the queue time of wafers in progress after certain processes. This can be especially important for processes that are sensitive to time. If the queue time of a lot is not well controlled, the yield quality can be seriously impacted. For example, wafers may need to be scrapped if the film quality is damaged by exposure to air.

Some lots may be forced to wait beyond the desired queue time due to insufficient capacity, for example when too many wafers are awaiting the same tool. To minimize this occurrence, a safety WIP (work in process) can be designed to control the dispatch problem within a queue time constraint. The safety WIP is used to control the queue WIP level so that the capacity demand for the WIP level does not exceed the current capacity. The current methods, however, are insufficient to meet the increasing demands of modern fabrication facilities.

SUMMARY OF THE INVENTION

The present invention includes embodiments that overcome several of the disadvantages found in the prior art. In one aspect, a multiple processing demand time (MPDT) formula is defined using Little's formula. A smart algorithm controls the lot dispatching for queue time constraints. For a given processing tool with multiple queue time constraints, the lot-dispatching control logic procedure at the tool can utilize an algorithm to systematically control the number of lots dispatched to any given tool.

In the preferred embodiment, the algorithm can be performed using the following steps. The queue time constraint tolerances and tool throughput are initialized for each product. Next the multiple processing demand time can be calculated for each product. The aggregating queue time constraint can then be calculated for each product. If the multiple processing demand time is less than the aggregating queue time constraint for each queue time limit tool, then any lot can be selected to be processed. Otherwise, the product at the given tool should be further processed.

As a specific example, aspects of the present invention can be used to fabricate a semiconductor device. In this process, the semiconductor device is processed at a first tool. A mean processing demand time can be calculated for the semiconductor device at a second tool and a queue time constraint tolerance can be calculated for the semiconductor device between the second tool and a third tool. The semiconductor device can then be dispatched to the second tool if the mean processing demand time is less than the queue time constraint. The semiconductor device can then be processed at the second tool and at the third tool.

Various aspects of the present invention have advantages over previously used methods. For example, the preferred embodiment approach has better control capability for lot scheduling and dispatching than the safety WIP approach. Also, the preferred embodiment approach can be easily utilized to control queue time constraints for complex multiple products. The preferred embodiment approach can also effectively solve the problems associated with single and multiple queue time constraints.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a model of a manufacturing line with a single queue time constraint; and FIG. 2 is a model of a manufacturing line with multiple queue time constraints.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a semiconductor fabrication facility (a main business of the assignee). The invention may also be applied, however, to other manufacturing facilities. For example, the facility could produce items such as electronics, consumer goods, chemical products, medical products and others.

In the semiconductor manufacturing industry, wafers are fabricated by sequentially performing processes often using different tools. The time between processes can be referred to as the queue time. Limits on this time can be referred to as queue time constraints. Queue time constraints are necessary to assure the quality of wafers in progress. A queue time constraint limits the queue time of a lot of wafers from a given process to the dedicated downstream process. With the queue time constraint, the wafers are processed at the dedicated process within the specified queue time. Especially for some critical processes or tools, those processed wafers are very sensitive to the exposing time before the downstream process.

If the queue time of a lot is not well controlled, it may seriously impact the lot yield quality. For example, wafers may be scrapped if the film quality of the wafers has been damaged when exposed in the air for too long a time. Thus, a goal of certain aspects of the invention is to carefully control the queue time constraints so that the number of lots processed in an amount of time greater than the queue time can be minimized. Achieving this goal helps to minimize the number of wafers that need to be reworked or scrapped. Therefore, the dispatching rule should be developed to select the lots before the queue time start tool is to be processed so that they can not be over queue time at the queue time-end tool.

The queue time constraint model can be classified as two main models: a single queue time constraint and multiple queue time constraints. The model with a single queue time constraint has one queue time constraint between two processing steps. It includes one queue time-start step 20 at tool $a_1$ and one queue time-end step 22 at tool $a_2$, as shown in FIG. 1 When wafers 10 and 12 are processed at the queue time-start step 20, the wafers at the queue time-end step 22 should be processed within the given queue time constraint tolerance. Tool $a_3$ is illustrated to depict a process step 24 that is free of queue time constraints (e.g., the time necessary before a further step is performed is long enough to not be concerned with).

In the preferred embodiment, tools $a_1$ and $a_2$ are separate tools that perform different functions. For example, tool $a_1$ could be a deposition chamber and tool $a_2$ a lithography tool. In another example, tool $a_1$ could be a via etch processing tool and tool $a_2$ could be a photoresist strip etching tool. In other examples, the tools could be different machines that perform the same function, e.g., two deposition chambers. In yet another embodiment, the tools could be stages within a single machine.

In semiconductor manufacturing processes, a single queue time constraint model can be further divided into two types. The first type includes a single queue time constraint without intermediate steps. This process, as illustrated in FIG. 1, includes two consecutive steps with single queue time constraint. The queue time-end step is the next processing step of the queue time-start step. As an example, the queue time constraint between the clean step and the furnace step is typical of this model.

Another type of model includes a single queue time constraint with intermediate steps. Not including the queue time-start and queue time-end steps, the process within the constraint includes some intermediate steps (not shown). Examples of these intermediate steps could include measurement steps (e.g., critical dimension measurements), inspection steps (e.g., inspections after etching), or others.

FIG. 2 illustrates a model with multiple queue time constraints. This model includes a set of steps with a single queue time constraint. As shown in FIG. 2, the queue time-end step at tool $a_2$ is also the queue time-start step for the next single queue time constraint. That is, a queue time constraint exists between steps 20 and 22 and also between steps 22 and 26. The process with the consecutive queue time constraints starting from the first queue time-start step 20 will be continuously limited until the process of the last queue time-end step 28 is completed. Hence, the WIP (work in process) within the multiple queue time constraints should be effectively controlled so that the over queue time events cannot happen due to insufficient capacity and limited operations. For a complex semiconductor manufacturing foundry, it is a very difficult job to control the operation problem with the multiple queue time constraints.

The discussion will now describe a first embodiment queue time limit dispatching control approach. Table 1 shows the notation for all WIP that include queue time constraints.

TABLE 1

| | |
|---|---|
| I(a) | In-processing WIP at tool a |
| Q(a) | WIP in the queue before tool a |
| W(a) | Q(a) + I(a) |
| PT(a) | The processing time at tool a |
| λ(a) | Processing rate (e.g., WIP per hour) at tool a |
| QT(a,b) | Queue time constraint tolerance between tool a and tool b |
| Q(a,b) | Total queue WIP from tool a to tool b, excluding Q(a) and I(b) |

The first case to be considered is the case of dispatching with a single queue time constraint at the queue time-start tool. As shown in FIG. 1, the dispatching rule for all lots at tool $a_1$ with single queue time constraint should consider the loading of tool $a_2$ and the queue between tool $a_1$ and tool $a_2$ when tool $a_1$ is available for processing. If the loading at tool $a_2$ is over the capacity provided by tool $a_2$, any lot or wafer at tool $a_1$ should not be further processed because some lots may wait longer than the queue time constraint limit due to insufficient capacity for current loading. In other words, whether or not one lot at tool $a_1$ can be processed will strongly depend on the current loading at tool $a_2$.

Currently, the use of a safety WIP (SW) level is the most common approach to control the loading degree between two queue time-constraint steps. In this approach, new wafers are not introduced to the relevant portion of the system if they will cause the WIP to exceed the safety WIP level. The safety WIP level SW between two tools $a_1$ and $a_2$ can be is defined as $$SW(a_1,a_2)=\lambda(a_2) \times QT(a_1,a_2) \qquad \text{Eq. (1)}$$

If the current queue WIP $Q(a_1, a_2)$ within a constraint is less than the safety WIP level, the capacity provided by tool $a_2$ will satisfy the capacity demand for all lots in the current queue $Q(a_1, a_2)$ within the given queue time-constraint tolerance. Thus, the lot with the highest priority, which is waiting at tool $a_1$, can be first selected as the candidate lot to be processed. Otherwise, the tool $a_2$ should be stopped to process any lot queuing at tool $a_1$. The safety WIP approach seems to be reasonable and effective for solving the queue time control problem with a single queue time constraint.

However, the current safety WIP approach has at least three main problems. First, it does not clearly design the safety WIP under different queue time tolerances for various products. Also, the safety WIP approach cannot effectively solve the queue time-constraint problems with different throughputs (e.g., WIP per hour). Further, the approach cannot be extended to solve the real operation problems with multiple queue time constraints.

To solve at least some of the above problems, the loading of tool $a_2$ can be viewed as the multiple processing demand processing time (MPDT) at tool $a_2$ for all lots in $Q(a_1,a_2)$. Under different throughputs for various products i, MDPT can be expressed as $$MPDT(a_2) = \sum_i \frac{Q_i(a_1, a_2)}{\lambda_i(a_2)} \qquad \text{Eq. (2)}$$

where $Q_i(a_1,a_2)$ is the queue WIP for product i with throughput $\lambda$ (recipe) between tools $a_1$ and $a_2$.

Hence, the dispatching rule at tool $a_1$ will consider the relationship between the multiple demand processing time and the queue time tolerance of each product. A general dispatching rule for queue time limit control is defined as follows.

Rule 1: If MPDT($a_2$)<$QT_i(a_1,a_2)$, then any lot with product i at tool $a_1$ will be selected as the candidate lot to be processed.

Rule 1 implies that tool $a_1$ has the remaining capacity for product i under the queue time constraints. So, some product i satisfying Rule 1 can be continuously processed at the queue time-start tool. If no product can satisfy Rule 1, it is suggested that tool $a_1$ discontinue processing due to insufficient capacity for the current queue time constraints.

Rule 1 can be re-phrased to specify three possible cases for dispatching control rules at tool $a_1$:

(1) if MPDT<$QT_i$, then product i can be processed;
(2) if MPDT>Max $\{QT_i\}$ then tool $a_1$ should be stopped; and
(3) if MPDT<Min $\{QT_i\}$ then any lot awaiting processing at tool $a_1$ can be dispatched.

The discussion will now consider the case of dispatching with multiple queue time constraints at the queue time-start tool. It is a complex problem to determine whether or not to dispatch a particular lot when a queue time-start tool operates under multiple queue time constraints. As shown in FIG. 2, tool $a_1$ not only checks the queue time constraint QT($a_1$, $a_2$) but also checks all consecutive queue time constraints QT($a_1$, $a_2$) for j=2, 3, . . . n. In other words, the capacity demand for all WIP at the consecutive queue time-constraint tools must be verified and checked based on the coming WIP for all queue time-constraint tools.

In the similar approach with single queue time constraint, the MPDT between $a_1$ and $a_j$ can be obtained by $$MPDT(a_1, a_j) = \sum_i \frac{Q_i(a_1, a_j)}{\lambda_i(a_j)} \qquad \text{Eq. (3)}$$

where $$Q_i(a_1, a_2) = \sum_{k=a_1+1}^{a_j} Q_i(k) + \sum_{k=a_1+1}^{a_{j-1}} I_i(k) \qquad (4)$$

for each WIP group i with queue time constraints.

Based on MPDT definition and calculation, the lot dispatching policy should satisfy the following conditions:

$$MPDT(a_1,a_j)<AQT_i(a_1,a_j) \text{ for all } j,1<j\leq n \qquad \text{Eq. (5)}$$

where the aggregate queue time AQT for a product i is calculated as:

$$AQT_i(a_1, a_j) = \sum_{k=2}^{j} QT_i(a_{k-1}, a_k) + \sum_{k=2}^{j-1} PT_i(a_k) \qquad \text{Eq. (6)}$$

Any lot at tool $a_1$ that satisfies Eq. (5) can be selected as the candidate lot to be processed. Further, the lot with the highest priority from all candidate lots can be first processed at tool $a_1$.

In summary, an algorithm to control the dispatching policy of the given tool with multiple queue time constraints is developed as follows:

Step 1: Initialize and setup the relative throughput and queue time constraint parameters for each product i.

Step 2: Calculate the overall MPDT for each product i, as shown in Eq. (3) and Eq. (4).

Step 3: Calculate the aggregating queue time constraint tolerance (AQT) as Eq. (6) for each product i.

Step 4: If Eq. (5) is satisfied, any lot being product i can be selected for processing; otherwise, the given tool should be stopped to process product i.

The problem of queue time dispatching can be modified to control for batch processing tools. Batch processes, e.g., furnace processes, are a type of process that is performed simultaneously on more than one lot. The processing time for a batch is typically longer than the processing time for other serial processes. In addition, the maximum lot size should be defined for a batch. Those lots with the same recipes can be processed together in one batch.

The operation of a batch process can be described with reference to an example. Generally, a clean process must be performed before a furnace (i.e., high temperature) process. Those wafers completing the clean process should be limited within a queue time constraint tolerance to complete the furnace process. In other words, the clean process is the queue time-start tool for the furnace process. On the other hand, the queue time-end tool is the furnace process. It can be understood that the furnace process is the dispatching model of combining queue time limit with batch process. In this case, the dispatch of a lot to the cleaning tool should consider the time to process other lots that will make up the batch process in the furnace process.

The queue time-limit dispatching control approach in the above-noted algorithm is used for the queue time-start tool. The approach is justified when the queue time-start tool with queue time constraints determines whether or not to process the next waiting lot based on the real-time capacity of downstream tools. Hence, it should be a general decision rule for each dispatching rule, which should check the queue time control status of the applied tool. The relative tool capacity is dynamically updated based on the real-time tool status.

The queue time-limit control is a very key point for assuring wafer quality during fab processing. The control algorithm should monitor the queue time limit WIP status and tool capacity under real-time conditions and give the relative tools the real-time control decision. However, the computational effort necessary to realize real-time monitoring can be very large. In general, decision results for queue time limit dispatching control can be updated every ten or fifteen minutes, or so. In other words, a periodic computation can be substituted for the real-time application when the computational requirements are inconvenient. The final output of the proposed algorithm can be a list of tool decisions that can provide a decision on whether or not a tool can process certain product lots (by technology) in a certain stage.

A specific example of the use of a tool will now be described. In this example, the output of a dispatch utilizing queue time limit dispatching control provides a list of queue time-start tools, technologies, stages, and go/no go decisions for queue time-start tools.

Tables 2 and 3 provide specific examples of how the algorithms described here can be implemented in a process. Referring first to Table 2, the first column shows the queue-time start tool or equipment group (or stage within a tool or equipment group). It is assumed that there are no time constraints as to when a lot should be processed at the start tool. The second column shows the queue time limit tools.

Table 3 illustrates how the MPDT can be calculated. The example shows the calculation between four different pairs of tools. In this case, the total MPDT (column labeled "MPDT Sum") is calculated as the sum of the MPDT for each of the three technologies. The calculation of the MPDT is derived from Equation 2 (or Equation 3), which is based on the total queue WIP Q and the capacity $\lambda$ of each tool $a_n$. The total queue WIP (Q (start, limit)) can be calculated by aggregating the queue WIP from the start to the limit tools as shown in Equation 4.

TABLE 3

| QT-start Tool | QT-Limit Tool | MPDT Sum | MPDT Tech 1 | MPDT Tech 2 | MPDT Tech 3 | Total Queue WIP Q(start, limit) Tech 1 | Tech 2 | Tech 3 | Capacity $\lambda$ Tech 1 | Tech 2 | Tech 3 |
|---|---|---|---|---|---|---|---|---|---|---|---|
| $\alpha_1$ | $\alpha_2$ | 0.42 | 0.27 | 0.075 | 0.075 | 270 | 75 | 75 | 1000 | 1000 | 1000 |
| $\alpha_3$ | $\alpha_4$ | 0.47 | 0.27 | 0.125 | 0.075 | 270 | 125 | 75 | 1000 | 1000 | 1000 |
| $\alpha_5$ | $\alpha_6$ | 0.325 | 0.025 | 0.2 | 0.1 | 25 | 200 | 100 | 1000 | 1000 | 1000 |
| $\alpha_7$ | $\alpha_8$ | 0.425 | 0.125 | 0.1 | 0.2 | 125 | 100 | 200 | 1000 | 1000 | 1000 |
| Total | | 1.64 | 0.69 | 0.5 | 0.45 | | | | | | |

The example of Table 2 shows five sequential queue time constraints. Any intervening tools, e.g., inspections or measurements, that do not affect the queue time constraints are not listed individually (but are included in the tolerances and processing time).

The queue time (QT) tolerance and processing time (PT) for each of three technologies (Tech 1, Tech 2 and Tech 3) are listed in the next columns. The QT tolerance and processing time parameters are obtained from the product technology routes and, as demonstrated in the tables, can vary for different process flows. In the example of a semiconductor foundry, the technologies could be based upon the minimum feature sizes (e.g., 150 nm, 180 nm or 250 nm) or product time (e.g., logic, memory or other).

The final columns provide the aggregate queue time tolerance AQT. These numbers can be calculated based upon the QT toleranace and processing time as shown in Equation 6 above. Once again, the AQT will typically vary for each product or process type.

The capacity for tool $a_n$ should be unified. For example, the factory might include a number of machines that perform the process of a tool. In that case, the throughput $\lambda$ of the recipe for each lot at that tool will be the total of the throughput of all tools. For example, if five of the same machines perform a given function, then the throughput will be 5×WPH at each relative processing machine. When some machines are not available, the relative capacity should be changed to the available number of the corresponding tools. In the above example, if one tool is not available, then the throughput will be reduced to 4×WPH.

The scope of the present application is not intended to be limited to the particular embodiments of the process, machine, manufacture, composition of matter, means, methods and steps described in the specification. As one of ordinary skill in the art will readily appreciate from the

TABLE 2

| QT-start Tool | QT-Limit Tool | Queue Time Tolerance QT($\alpha_n, \alpha_{n+1}$) Tech 1 | Tech 2 | Tech 3 | Processing Time PT($\alpha_n$) Tech 1 | Tech 2 | Tech 3 | Aggregate Queue Time AQT($\alpha_1, \alpha_n$) Tech 1 | Tech 2 | Tech 3 |
|---|---|---|---|---|---|---|---|---|---|---|
| $\alpha_1$ | α1 | 6 | 8 | 12 | | | | | | |
| | α2 | 8 | 8 | 8 | 1 | 1 | 1 | 6 | 8 | 12 |
| | α3 | 8 | 8 | 8 | 2.5 | 2.5 | 2.5 | 15 | 17 | 21 |
| | α4 | 8 | 8 | 8 | 1 | 1 | 1 | 25.5 | 27.5 | 31.5 |
| | α5 | | | | | | | 34.5 | 36.5 | 40.5 |

The information provided in Table 2 can be utilized to determine which lots, if any, can be dispatched. For example, if the multiple processing demand time MPDT at tool $a_2$ is equal to 18, then only lots with an aggregate queue time (AQT) greater than 18 can be processed. Referring to Table 2, this implies that lots from technology Tech 1 (18>15, where 15 is the AQT for Tech 1) and technology Tech 2 (18>17, where 17 is the AQT for 18 L) should not be processed at tool $a_2$ at that moment.

disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for determining which, if any, of a plurality of products should be introduced to a manufacturing system, the method comprising:

initializing a relative throughput and a queue time constraint parameter for each product of the plurality of products;

calculating an overall multiple processing demand time for each product;

calculating an aggregating queue time constraint tolerance for each product; and determining which, if any, product can be introduced to the manufacturing system by comparing the multiple processing demand time to the aggregating queue time constraint.

2. The method of claim 1 wherein a product can be introduced to the manufacturing system if the multiple processing demand time is less than the aggregating queue time constraint.

3. The method of claim 1 wherein it is determined that no product should be introduced to the manufacturing system if no product meets the condition where the multiple processing demand time is less than the aggregating queue time constraint.

4. The method of claim 1 wherein calculating a multiple processing demand time comprises calculating a multiple processing demand time between two tools wherein the multiple processing demand time between two tools a and b (MPDT(a, b)) is determined by the formula $$MPDT(a_1, a_j) = \sum_i \frac{Q_i(a_1, a_j)}{\lambda_i(a_j)}$$

where $\lambda_i(a)$ is the processing rate for product i at tool a, and where $$Q_i(a_1, a_2) = \sum_{k=a_1+1}^{a_j} Q_i(k) + \sum_{k=a_1+1}^{a_j-1} I_i(k)$$

where $Q_i(k)$ is the work in process for product i in a queue before tool k and $I_i(k)$ is the work in process of product i at tool k.

5. The method of claim 1 wherein the aggregating queue time is calculated by the formula $$AQT_i(a_1, a_j) = \sum_{k=2}^{j} QT_i(a_{k-1}, a_k) + \sum_{k=2}^{j-1} PT_i(a_k)$$

where $QT_i(a,b)$ is the queue time constraint tolerance between tool a and tool b for product i and wherein $PT_i(a)$ is the processing time at tool a for product i.

6. The method of claim 1 wherein the manufacturing system comprises a portion of a manufacturing system.

7. The method of claim 6 wherein the manufacturing system comprises a tool in a semiconductor wafer manufacturing system.

8. The method of claim 1 wherein determining which, if any, product can be introduced comprises determining which, if any, product can be processed at a first tool, wherein the multiple processing demand time is a function of a the first tool and a second tool.

9. The method of claim 8 wherein the multiple processing demand time is also function of the first tool and a third tool.

10. The method of claim 8 wherein the multiple processing demand time is also a function of the second tool and a third tool.

11. A method of making a semiconductor device, the method comprising:

processing the semiconductor device at a first tool;

calculating a multiple processing demand time for the semiconductor device at a third tool;

calculating a queue time constraint tolerance for the semiconductor device between the second tool and a third tool;

dispatching the semiconductor device to the second tool if the multiple processing demand time is less than the queue time constraint;

processing the semiconductor device at the second tool; and processing the semiconductor device at the third tool.

12. The method of claim 11 and further comprises if the multiple processing demand time is greater than the queue time constraint then holding the semiconductor device until the multiple processing demand time is less than the queue time constraint.

13. The method of claim 11 wherein processing the semiconductor device at the second tool comprises depositing a layer on the semiconductor device in a deposition chamber.

14. The method of claim 13 wherein processing the semiconductor device at the third tool comprises etching the layer.

15. The method of claim 11 wherein calculating a multiple processing demand time comprises calculating a multiple processing demand time between the second tool and the third tool wherein the multiple processing demand time (MPDT) is determined by the formula $$MPDT(1st\_tool, 2nd\_tool) = \frac{Q(1st\_tool, 2nd\_tool)}{\lambda(2nd\_tool)}$$

where $Q(1st\_tool, 2nd\_tool)$ is based on the number of semiconductor devices that have been processed at the first tool and are awaiting processing at the second tool and wherein $\lambda(2nd\_tool)$ is the processing rate for the semiconductor device at the second tool.

16. The method of claim 11 wherein dispatching the semiconductor device includes selecting the semiconductor device from a group of semiconductor devices awaiting processing at the second tool.

17. The method of claim 11 and further comprising processing the semiconductor device at a fourth tool after processing the semiconductor device at the second tool but before processing the semiconductor device at the third tool.

18. The method of claim 17 wherein processing the semiconductor device at a fourth tool comprises measuring at least one characteristic of the semiconductor device.

* * * * *

UNITED STATES PATENT AND TRADEMARK OFFICE
CERTIFICATE OF CORRECTION

PATENT NO. : 6,647,307 B1
DATED : November 11, 2003
INVENTOR(S) : Huang et al.

It is certified that error appears in the above-identified patent and that said Letters Patent is hereby corrected as shown below:

Column 4,
Line 50, delete the word "is".

Column 5,
Line 14, delete "$\lambda$" and replace it with -- $\lambda_i$ --.
Line 43, delete "$a_2$" and replace it with -- $a_j$ --.

Column 6,
Line 3, Equation 6, should read $AQT_i(a_i, a_j) = \sum_{k=2}^{j} QT_i(a_k - 1, a_k) + \sum_{k=2}^{j-1} PT_i(a_k)$.

Column 7,
Line 41, delete "toleranace" and replace it with -- tolerance --.

Column 9,
Line 52, delete "$QT_i(a,b)$" and replace it with -- $AQT_i(a,b)$ --.
Line 53, delete "$PT_i(a)$" and replace it with -- $PT_i(a_k)$ --.

Column 10,
Line 2, add the word -- a -- immediately following "also".

Signed and Sealed this

Seventeenth Day of February, 2004

JON W. DUDAS
*Acting Director of the United States Patent and Trademark Office*